United States Patent [19] [11] 4,194,999
Hayashi et al. [45] Mar. 25, 1980

[54] PROCESS FOR PRODUCING POWDERY RUBBER

[75] Inventors: Takao Hayashi; Yasuhiro Sakanaka; Akihiko Shimizu, all of Shin-nanyo, Japan

[73] Assignee: Toyo Soda Manufacturing Company, Ltd., Yamaguchi, Japan

[21] Appl. No.: 849,467

[22] Filed: Nov. 7, 1977

[30] Foreign Application Priority Data

Dec. 13, 1976 [JP] Japan .................. 51/148732

[51] Int. Cl.$^2$ .............................................. C08L 1/28
[52] U.S. Cl. .................. 260/17 R; 260/4 R; 260/17.4 BB; 260/17.4 ST; 260/29.7 WA; 260/815; 260/816 G; 260/821; 525/194; 525/197; 525/199; 525/203; 525/212; 525/215; 525/217; 525/221; 525/222; 525/227; 525/230; 525/232; 525/233; 525/235
[58] Field of Search ................. 260/4 R, 17 R, 816 G

[56] References Cited

U.S. PATENT DOCUMENTS

| 3,632,507 | 1/1972 | Witt | 260/821 |
| 3,875,104 | 4/1975 | Siegele | 260/821 |
| 3,915,909 | 10/1975 | Schnoring | 260/17.4 BB |
| 4,031,302 | 6/1977 | Shimizu et al. | 260/821 |
| 4,076,661 | 2/1978 | Kassner | 260/17.4 BB |

FOREIGN PATENT DOCUMENTS 388341 2/1933 United Kingdom ............... 260/816 G

OTHER PUBLICATIONS

Chem. Absts., vol. 85: 109805x–"Chlorinated Rubber Particles," Nakazora et al.

Primary Examiner—Edwad M. Woodberry
Attorney, Agent, or Firm—Oblon, Fisher, Spivak, McClelland & Maier

[57] ABSTRACT

A powdery rubber is produced by mixing an anionic or nonionic rubber latex with an aqueous solution of an anionic water soluble macro-molecular compound which is dissociated in water to give negative charge; adjusting the pH to an acidic condition; adding to the aqueous solution either a cationic polymer which is water soluble in an acidic condition or a cationic surfactant which causes a coacervation with the anionic water soluble macromolecular compound in an acidic condition to separate the rubber particles from the rubber latex under coacervation and adding an emulsion of a synthetic resin having a glass transition temperature higher than 30° C. to the rubber particles at a ratio of 1 to 50 wt.% (as a solid content) to the solid content of the rubber latex and dehydrating and drying the resulting powdery rubber.

6 Claims, No Drawings

PROCESS FOR PRODUCING POWDERY RUBBER

BACKGROUND OF THE INVENTION

1. Field of the Invention

The present invention relates to a process for producing a powdery rubber. More particularly, it relates to a process for producing a powdery rubber from an anionic or nonionic rubber latex which comprises treating the anionic or nonionic rubber latex to separate it into two phases i.e. a rubber particle phase and a water phase and then, adding an emulsion of a synthetic resin to absorb particles of the synthetic resin on the rubber particles and dehydrating and drying the resulting powdery rubber.

2. Description of the Prior Arts

Heretofore, rubber has been separated from a rubber latex and the separated rubber is supplied in a form of relatively large block, bulk or chip. However, it has been required to cut the rubber into fine pieces for certain uses or in certain applications. For example, when a blocked synthetic rubber is molded, the blocked rubber is cut into pieces and weighed and kneaded by suitable kneading methods using a Banbury mixer or a roll mixing blender.

In these cases, if the rubber is supplied in the form of powder or pellets, the step of cutting into fine pieces can be eliminated and the rubber can be automatically supplied to a weighing machine or a processing machine. Moreover, in the processing operation when the rubber is in the form of powder, the blend with various chemicals or fillers can be easily carried out advantageously.

Recently, the uses of the rubber with various thermoplastic resins in blend forms have increased depending on the increase of applications of the rubber.

The synthetic resins are usually supplied in the form of powder or pellets whereby the rubbers used for these purposes are preferably in the form of powder because of the uniform distribution of the synthetic rubber.

When the rubber is in a form of powder, the rubber can be quantitively and continuously supplied to a uniaxial extruder or a biaxial extruder together with the synthetic resin, whereby a continuous processing operation can be attained. In spite of these demands, most of the rubbers have been supplied in the block or chip form.

The rubbers have high tackiness or elasticity even at room temperature whereby even though the rubber is pelletized, the pellets adhere to each other to form blocks during storage or transfer.

Various methods have been studied to obtain powdery rubber which does not adhere to form blocks.

As the conventional methods, the following methods have been employed. The rubber is pulverized by a grinder and the pulverized rubber in the form of the suspension in air is mixed with an aqueous dispersion of an antiblocking agent such as talc, calcium carbonate. Water is then separated to obtain the powdery rubber which is further coated with a dusting powder.

The rubber is quenched to lower than brittle point by treating it with liquid nitrogen etc., and the rubber is pulverized by the ejection of jet flow or the application of ultrasonic waves and then coated with an antiblocking agent to obtain powdery rubber.

The rubber is separated from the latex by addition of a salt, an aqueous dispersion of carbon black is added under stirring and the resulting rubber mixture is dried and pulverized.

However, in these conventional methods, high degree of heat is generated by the friction of rubber caused by the elasticity or tackiness of the rubber whereby the elimination of the heat and the uniform pulverization are disadvantageously not easy, Moreover, this process is not economical because of its high cost, the power for pulverizing the rubber is limited and a large amount of the inorganic material is disadvantageously incorporated into the powdery rubber,

SUMMARY OF THE INVENTION

It is an object of the present invention to provide a process for producing a powdery rubber which need not contain an inorganic material and has high stability in storage by using an anionic or nonionic rubber latex.

The foregoing and other objects of the present invention have been atttained by producing a powdery rubber which comprises mixing an anionic or nonionic rubber latex with an aqueous solution of an anionic water soluble macromolecular compound which is dissociated in water to give negative charge at a ratio of 0.1 to 10 wt. % to the solid content of the rubber latex; adjusting pH of the mixture to an acidic condition; adding to the aqueous solution either a cationic polymer which is water soluble in acidic condition or a cationic surfactant which causes a coacervation with the anionic water soluble macromolecular compound in an acidic condition at a ratio of 0.1 to 10 wt. % to the solid content of the rubber latex to separate the rubber particles from the rubber latex under the coacervation; and adding an emulsion of a synthetic resin having a glass transition temperature higher than 30° C. to the rubber particles at a ratio of 1 to 50 wt. % (as a solid content) to the solid content of the rubber latex and dehydrating and drying the resulting powdery rubber.

DETAILED DESCRIPTION OF THE PREFERRED EMBODIMENTS

The rubbers used in the process of the present invention can be obtained as the anionic or nonionic latex.

Suitable rubbers include natural rubber (NR); homopolymers of a conjugated diene of isoprene, butadiene or chloroprene such as polyisoprene rubber (IR), polybutadiene rubber (BR) and polychloroprene rubber (CR) and copolymers of a conjugated diene and a vinyl compound such as styrene, acrylonitrile, vinylpyridine, acrylic acid, methacrylic acid, alkyl acrylate or alkyl methacrylate such as styrene-butadiene copolymer rubber (SBR), acrylonitrile-butadiene copolymer rubber (NBR), vinylpyridine-butadiene-styrene copolymer rubber, acrylic acid-butadiene copolymer rubber, methacrylic acid-butadiene copolymer rubber, methyl acrylate butadiene copolymer rubber, methyl methacrylate butadiene copolymer rubber; and copolymers of a diene and an olefin such as ethylene, propylene or isobutylene such as isobutylene-isoprene copolymer rubber (IIR).

Suitable anionic water soluble macromolecular compounds which are dissociated in water to give negative charge include natural compounds such as sodium alginate, gum arabi, carrageenan, agar; and synthetic compounds such as sodium carboxymethyl cellulose, polyvinyl sulfonic acid, polystyrenesulfonic acid, acrylic acid-methyl acrylate copolymer, methacrylic acid-methyl methacrylate copolymer vinyl acetate-crotonic acid copolymer, styrene-maleic acid copolymer, cellulose acetate phthalate, starch acetate phthalate etc.

The water soluble macromolecular compound is used at a ratio of 0.1 to 10 wt. % preferably 1 to 5 wt. % to the solid content of the rubber latex and it is admixed with the rubber latex in the form of an aqueous solution.

Suitable compounds which form coacervation with the anionic water soluble macromolecular compound in an acidic condition include cationic polymers which are water soluble in an acidic condition such as polyvinyl pyridine, polybenzylaminoethyl cellulose, polydiethylaminoethyl styrene, polyvinyl benzylamine; and cationic surfactants such as acetic acid salts, hydrochlorides, sulfates, dimethylsulfates, nitrates and quaternary ammonium salts of higher amines such as dodecyltrimethylamine, cetyltrimethylamine, stearyldimethylbenzylamine, dodecyldimethyl benzylamine, coconut alkyl dimethylamine, hydrogenated tallow alkyl dimethylamine, polyoxyethylene tallow alkyl propylenediamine, dodecyltriethanolamine, coconut alkylamine, dodecylamine, tallow alkylamine, cetylamine, stearylamine, hydrogenated tallow alkylamine etc.

The cationic polymer or the cationic surfactant is used at a ratio of 0.1 to 10 wt. % preferably 1 to 5 wt. % of the solid content of the rubber latex and it is incorporated in the form of an aqueous solution.

In the process of the present invention, the rubber latex is admixed with the anionic water soluble macromolecular compound and the mixture is acidified by adding an acid and the acidified mixture is added to an aqueous solution of the cationic polymer or the cationic surfactant which forms the coacervation with the anionic water soluble macromolecular compound whereby the coacervation causes the separation of a rubber particle phase and a water phase. Accordingly, it is necessary to effectively carry out the coacervation.

In the reaction, it is preferable to preliminarily determine suitable ratio of the anionic water soluble macromolecular compound to the cationic polymer or the cationic surfactant for causing the coacervation in the absence of the rubber latex.

The rubber latex is admixed with an aqueous solution of the anionic water soluble macromolecular compound and then, an inorganic acid such as hydrochloric acid, sulfuric acid, nitric acid or an organic acid such as acetic acid is added to it to give an acidic condition preferably pH of about 4 to 5. In such case, the anionic water soluble macromolecular compound imparts a protective colloidal effect whereby a coagulated latex is not formed even though it is in an acidic condition. When the acidic mixture is poured into an aqueous solution of a cationic surfactant or a cationic polymer while stirring, the coacervation causes the separation of two phases by precipitating the rubber as fine particles. In accordance with the above-mentioned treatment, the rubber latex, is separated into two phases: the rubber particle phase and the water phase. The operation is carried out by mixing the solutions under stirring and adjusting pH of the solution, whereby the operation can be easily carried out under precise control and the rubber is precipitated as fine particles to result in the separation of two phases. In the operation, the amount of water in the solution and the share of the stirring slightly affect the operation, however, they are not so important factors and they can be easily selected by preliminary tests.

The fine particles of the rubber separated by the coacervation are admixed with an emulsion of synthetic resin and the powdery rubber is separated, dehydrated and dried.

The rubber particles obtained by the separation into two phases, can be easily filtered by using a filter cloth and they can be easily washed with water. However, if the rubber particles are dehydrated by a centrifugal separation, the rubber particles are adhered each other after the dehydration to form a block because of the centrifugal force. It is difficult to obtain the rubber in the powder form.

In accordance with the present invention, the problem has been overcome by the addition of an emulsion of the synthetic resin. The particles of the synthetic resin emulsion are absorbed on the surface of the rubber particles when they are dehydrated and dried whereby the adhesion of the rubber particles is prevented thereby obtaining a powdery rubber having good fluidity.

The emulsions of the synthetic resin used in the process of the present invention are an emulsion dispersing of the synthetic resin particles having a glass transition temperature of higher than 30° C. in an aqueous medium.

Suitable emulsions of the synthetic resin include polystyrene emulsion, polymethyl methacrylate emulsion, methyl methacrylate-methyl acrylate copolymer emulsion, polyvinyl chloride emulsion, vinyl chloride-vinylidene chloride copolymer emulsion, polyvinyl acetate emulsion, styrene-acrylonitrile copolymer emulsion, styrene-itaconic acid copolymer emulsion, styrene-methyl methacrylate copolymer emulsion, styrene-vinyl chloride copolymer emulsion, polyvinyl fluoride, fluorinated resin emulsion e.g., polychlorotrifluoroethylene etc.

The emulsion of synthetic resin is incorporated into the system dispersing the fine rubber particles which result from the phase separation at a ratio of 1 to 50 wt. % preferably 3 to 15 wt. % as a solid content to a solid content of the rubber latex. When the amount of the synthetic resin is less than 1 wt. %, it is difficult to impart a satisfactory effect whereby the rubber can not be obtained in the powder form to avoid formation of blocks. On the other hand, when the amount of the synthetic resin is more than 50 wt. %, the property of rubber is disadvantageously lost.

In order to satisfactorily absorb the particles of the synthetic resin emulsion on the surface of the fine rubber particles dispersed in water, it is necessary to thoroughly stir the mixture after the addition of the emulsion of synthetic resin, and it is enough to stir the mixture for more than 30 minutes.

In order to quickly absorb the particles of the synthetic resin emulsion at higher ratio, it is possible to add an inorganic electrolyte such as sodium chloride, potassium chloride, sodium sulfate, calcium chloride, magnesium sulfate, zinc sulfate and aluminum chloride or a lower alcohol such as methanol and ethanol or acetone.

The additive can be easily removed by washing with water after separating the powdery rubber by filtration etc. whereby the additive does not remain in the powdery rubber.

The powdery rubber which is separated and washed with water by the above-mentioned steps can be easily dehydrated by centrifugal separation. The synthetic resin is absorbed on the surface of the rubber particles whereby the adhesion of the rubber particles is prevented. Accordingly, the rubber particles are not adhered to each other to form block even though the centrifugal gravity is applied under rotation speed of several thousands to several ten thousands r.p.m. The powdery rubber having fluidity or the pulverizable rubber which can be easily pulverized into the powder rubber can be obtained.

Thus, the dehydrated powdery rubber is dried. The drying operation can be selected as desired such as the air-flow drying method, the hot air drying method, the vacuum drying method, the fluidized drying method etc.

In order to obtain the powdery rubber having uniform particle size, it is preferable to select the method of drying under a fluidized condition such as a fluidized drying method and a vibration drying method.

In accordance with the process of the present invention, powdery rubber which does not substantially contain an inorganic material and has a particle diameter of about 2 mm or less can be effectively obtained.

A further understanding can be obtained by reference to certain specific examples which are provided herein for purposes of illustration only and are not intended to be limiting unless otherwise specified. In the examples, the term "part" means "part by weight", unless otherwise specified.

Rubber latex and synthetic resin emulsion used in the examples (A) Polychloroprene rubber latex (referring to as (CR)

In nitrogen gas atmosphere, 4.0 wt. parts of potassium rosined soap, 0.4 wt. part of sodium hydroxide and 0.4 part of a formaldehyde sodium naphthalene sulfonate condensate were dissolved in 100 wt. parts of water and 100 wt. parts of chloroprene containing 0.2 wt. part of n-dodecyl mercaptane and 0.1 wt. part of 2,6-di-t-butyl-p cresol was mixed with the aqueous solution to emulsify it and the polymerization was carried out under adding dropwise 1% aqueous solution of potassium persulfate at 40° C.

The polymerization was stopped at a conversion of 70% and the unreacted chloroprene was distilled off to obtain polychloroprene rubber latex having 35 wt. % of a solid content.

(B) Acrylonitrile-butadiene copolymer rubber latex (referring to as NBR)

Acrylonitrile-butadiene copolymer rubber latex (Trade name Nipol 1571 manufactured by Nippon Zeon Co., Ltd.) was diluted to give 35 wt. % of a solid content.

(C) Polybutadiene rubber latex (referring to as BR)

Polybutadiene rubber latex (Trade name JSR 07 00 manufactured by Japan Synthetic Rubber Co., Ltd.) was diluted to give 35 wt. % of a solid content.

(D) Styrene-butadiene copolymer rubber latex (referring to as SBR)

Styrene-butadiene copolymer rubber latex (Trade name of JSR 0561 manufactured by Japan Synthetic Rubber Co., Ltd.) was diluted to give 35 wt. % of a solid content.

(E) Polymethyl methacrylate emulsion (referring to as PMMA)

In nitrogen gas atmosphere, 7.5 wt. parts of sodium alkylaryl polyoxyethylenesulfonate and 0.75 wt. part of sodium dodecylbenzenesulfonate were dissolved in 200 wt. parts of water and then, 150 wt. parts of methyl methacrylate was added to the aqueous solution and potassium persulfate was used as a polymerization initiator and the polymerization was carried out at 75° C. to obtain polymethyl methacrylate emulsion having 42 wt. % of a solid content.

(F) Polyvinyl chloride emulsion (referring to as PVC)

Polyvinyl chloride emulsion (Trade name of Geon 151 manufactured by Nippon Zeon Co., Ltd.) was diluted to give 47 wt. % of a solid content.

(G) Polystyrene emulsion (referring to as PSt)

In nitrogen gas atmosphere, 7.5 wt. parts of sodium alkylaryl polyoxyethylenesulfonate and 0.7 wt. part of sodium laurylsulfate were dissolved in 100 wt. parts of water and then, 65 wt. parts of styrene was added to the aqueous solution and potassium persulfate was used as a polymerization initiator and the polymerization was carried out at 70° C. to obtain polystyrene emulsion having 40 wt. % of a solid content.

EXAMPLES 1 to 6

The powdery rubbers were prepared by the combinations of the components shown in Table 1.

A 20 wt. parts of the rubber latex was added to 20 wt. parts of 1% aqueous solution of each anionic water soluble high molecular weight compound and the mixture was stirred to form a uniform mixture and 10% aqueous solution of acetic acid was gradually added to adjust pH to 4.5.

The mixture was poured into 200 wt. parts of 0.1% aqueous solution of higher amine acetate under vigorously stirring at the room temperature whereby the rubber was immediately separated in a fine powder form. The suspension was washed with water by the decantation and the synthetic resin emulsion was added to the aqueous suspension dispersing the fine powder of the rubber to give 6 wt. % of the synthetic resin based on a solid content of the rubber latex. The mixture was stirred for about 1 hour. The mixture was filtered with a cotton cloth and washed with water and dehydrated by a centrifugal separator whereby the powdery rubber which had fluidity and easily pulverized was obtained.

The powdery rubber was dried in a hot air oven to obtain the powdery rubber having uniform particle size as shown in Table 2. As shown in Reference 1, when the synthetic resin emulsion was not added, the rubber particles are adhered each other to block them in a bulk form. When the rubber was dehydrated by the centrifugal separator.

Table 1

| Example | Rubber latex | Anionic water soluble high molecular weight compound | Higher amine acetate | Synthetic resin emulsion |
|---|---|---|---|---|
| 1 | CR | CMC | N-DT 203 | PMMA |
| 2 | CR | Na alginate | Coconut alkyl dimethylamine | PSt |
| 3 | CR | Gum arabi | Tetradecyl amine | PVC |
| 4 | BR | CMC | N-DT 203 | PSt |
| 5 | NBR | CMC | N-DT 203 | PMMA |
| 6 | SBR | Na alginate | N-DT 203 | PSt |
| Reference 1 | CR | CMC | N-DT 203 | none |

CMC: Sodium carboxymethyl cellulose
N-DT 203: Polyoxyethylene tallow alkyl propylenediamine (manufactured by Nippon Oil & Fats Co., Ltd.)

Table 2

| Example | less than 20 mesh pass (wt.%) | more than 20 mesh pass (wt.%) | more than 14 mesh pass (wt.%) |
|---|---|---|---|
| 1 | 98.7 | 1.2 | 0.1 |
| 2 | 99.9 | 0.1 | 0.0 |
| 3 | 94.5 | 4.3 | 1.2 |
| 4 | 99.0 | 1.0 | 0.0 |
| 5 | 96.3 | 2.5 | 1.2 |
| 6 | 93.8 | 4.8 | 1.4 |
| Reference 1 | Bulk | | |

EXAMPLE 7

A 20 wt. parts of 1% aqueous solution of sodium carboxymethyl cellulose was added to the CR latex to prepare a uniform mixture and 10% aqueous solution of acetic acid was added to adjust pH to 4.5. The mixture was poured into 200 wt. parts of 0.1% aqueous solution of polyvinylpyridine hydrochloride under vigorously stirring at the room temperature whereby the rubber was immediately separated in a fine powder form. The suspension was washed with water by the decantation and the PMMA emulsion was added to the aqueous suspension to give 6 wt. % of the synthetic resin based on a solid content of the rubber latex. The mixture was stirred for about 1 hour. The mixture was filtered with a cotton cloth and washed with water and dehydrated by a centrifugal separator whereby the powdery rubber which can be easily pulverized was obtained. The powdery rubber was dried to obtain the powdery rubber having uniform particle size (96.3 wt. %: less than 20 mesh pass).

EXAMPLE 8

In accordance with the process of Example 7 except using the NBR latex instead of the CR latex, and sodium alginate, instead of carboxymethyl cellulose and polybenzylaminoethyl cellulose hydrochloride, instead of polyvinylpyridine hydrochloride, the dried powdery rubber (95.8 wt. %: less than 20 mesh pass) was obtained.

What is claimed is:

1. A process for producing a powdery rubber which comprises
   mixing a rubber latex selected from the group consisting of anionic and nonionic rubber latex, with an aqueous solution of an anionic water soluble macromolecular compound which is dissociated in water to give negative charge at a ratio of 0.1 to 10 wt. % to the solid content of the rubber latex;
   adjusting the pH of the mixture to an acidic condition;
   adding to the aqueous solution a cationic compound selected from the group consisting of cationic polymers which are water soluble in acidic condition and cationic surfactants, which cationic compound causes a coacervation with the anionic water soluble macromolecular compound in an acidic condition, at a ratio of 0.1 to 10 wt. % to the solid content of the rubber latex thereby
   separating the rubber particles from the rubber latex under the coacervation; and
   adding an emulsion of a synthetic resin having a glass transition temperature higher than 30° C. to the rubber particles at a ratio of 1 to 50 wt. % (as a solid content) to a solid content of the rubber latex and
   dehydrating and drying the resulting powdery rubber.

2. A process according to claim 1 wherein the anionic water soluble macromolecular compound is selected from the group consisting of sodium alginate, gum arabic, carrageenan, agar, sodium carboxymethyl cellulose, polyvinyl sulfonic acid, polystyrenesulfonic acid, acrylic acid-methyl acrylate copolymer, methacrylic acid-methyl methacrylate copolymer, vinyl acetate-crotonic acid copolymer, styrene-maleic acid copolymer, cellulose acetate phthalate, and starch acetate phthalate.

3. A process according to claim 1 wherein the cationic compound which causes a coacervation with the anionic water soluble macromolecular compound is selected from the group consisting of polyvinyl pyridine, polybenzylaminoethyl cellulose, polydiethylaminoethyl styrene, polyvinyl benzylamine; acetic acid salts, hydrochlorides, sulfates, dimethylsulfates, nitrates and quaternary ammonium salts of higher amines selected from the group consisting of dodecyltrimethylamine, cetyltrimethylamine, stearyldimethylbenzylamine, dodecyldimethylbenzylamine, coconut alkyl dimethylamine, hydrogenated tallow alkyl dimethylamine, polyoxyethylene tallow alkyl propylenediamine, dodecyltriethanolamine, coconut alkylamine, dodecylamine, tallow alkylamine, cetylamine, stearylamine, and hydrogenated tallow alkyl amine.

4. A process according to claim 1 wherein the emulsion of synthetic resin is selected from the group consisting of polystyrene emulsion, polymethyl methacrylate emulsion, methyl methacrylate-methyl acrylate copolymer emulsion, polyvinyl chloride emulsion, vinyl chloridevinylidene chloride copolymer emulsion, polyvinyl acetate emulsion, styreneacrylonitrile copolymer emulsion, styrene-itaconic acid copolymer emulsion, styrene-methylmethacrylate copolymer emulsion, styrene-vinylchloride copolymer emulsion, polyvinylfluoride, and fluorinated resin emulsion.

5. A process according to claim 1 wherein the coacervation is resulted by adding an acidic mixture of the rubber latex and the anionic water soluble macromolecular compound to an aqueous solution of the cationic polymer or the cationic surfactant under vigorously stirring.

6. The powdery rubber prepared by the process of claim 1.